United States Patent
Bommelaer et al.

(10) Patent No.: US 6,382,517 B1
(45) Date of Patent: May 7, 2002

(54) DEVICE FOR EQUALIZING HOT WATER AND COLD WATER PRESSURES AND FAUCET, PARTICULARLY THERMOSTATIC, FOR SAID EQUALIZING DEVICE

(75) Inventors: Christian Bommelaer, Friaucourt; Laurent Bongrand, Verneuil sur Igneraie, both of (FR)

(73) Assignee: Watts Eurotherm SA, Fressenneville (FR)

( * ) Notice: Subject to any disclaimer, the term of this patent is extended or adjusted under 35 U.S.C. 154(b) by 0 days.

(21) Appl. No.: 09/505,061

(22) Filed: Feb. 16, 2000

(30) Foreign Application Priority Data

Feb. 16, 1999 (FR) .............................................. 99 02037

(51) Int. Cl.[7] .............................................. G05D 23/13
(52) U.S. Cl. ...................................... 236/12.2; 137/100
(58) Field of Search .......................... 236/12.2; 137/100

(56) References Cited

U.S. PATENT DOCUMENTS

| | | | | |
|---|---|---|---|---|
| 2,657,860 A | * | 11/1953 | Schmidt et al. ............. | 236/12.2 |
| 3,061,195 A | * | 10/1962 | Bowman .................... | 236/12.2 |
| 3,724,480 A | | 4/1973 | Povalsky et al. ............. | 137/98 |
| 3,768,728 A | * | 10/1973 | Blank .......................... | 236/12.2 |
| 4,241,749 A | * | 12/1980 | Petursson .................... | 137/100 |
| 4,324,267 A | * | 4/1982 | Bach ........................... | 137/100 |
| 4,923,092 A | * | 5/1990 | Kirschner et al. ........... | 137/100 |
| 5,129,576 A | * | 7/1992 | Pullen et al. ................ | 236/12.2 |
| 5,161,737 A | | 11/1992 | Olmsted et al. ............. | 236/12.21 |
| 5,341,987 A | | 8/1994 | Ackroyd ..................... | 236/12.21 |
| 5,931,181 A | * | 8/1999 | Cook et al. .................. | 137/100 |
| 6,095,176 A | * | 8/2000 | Yang ............................ | 137/100 |

OTHER PUBLICATIONS

Stella; abstract; FIGS. 1–4 (Great Britain); GB 2 003 582 A.

* cited by examiner

*Primary Examiner*—William E. Tapolcai
(74) *Attorney, Agent, or Firm*—William L. Feeney; Miles & Stockbridge, P.C.

(57) ABSTRACT

The invention relates to a device for equalizing the hot water and cold water pressures in a hot water faucet for sanitary use comprising, upstream from a thermostatic unit (200);

Figure 1:
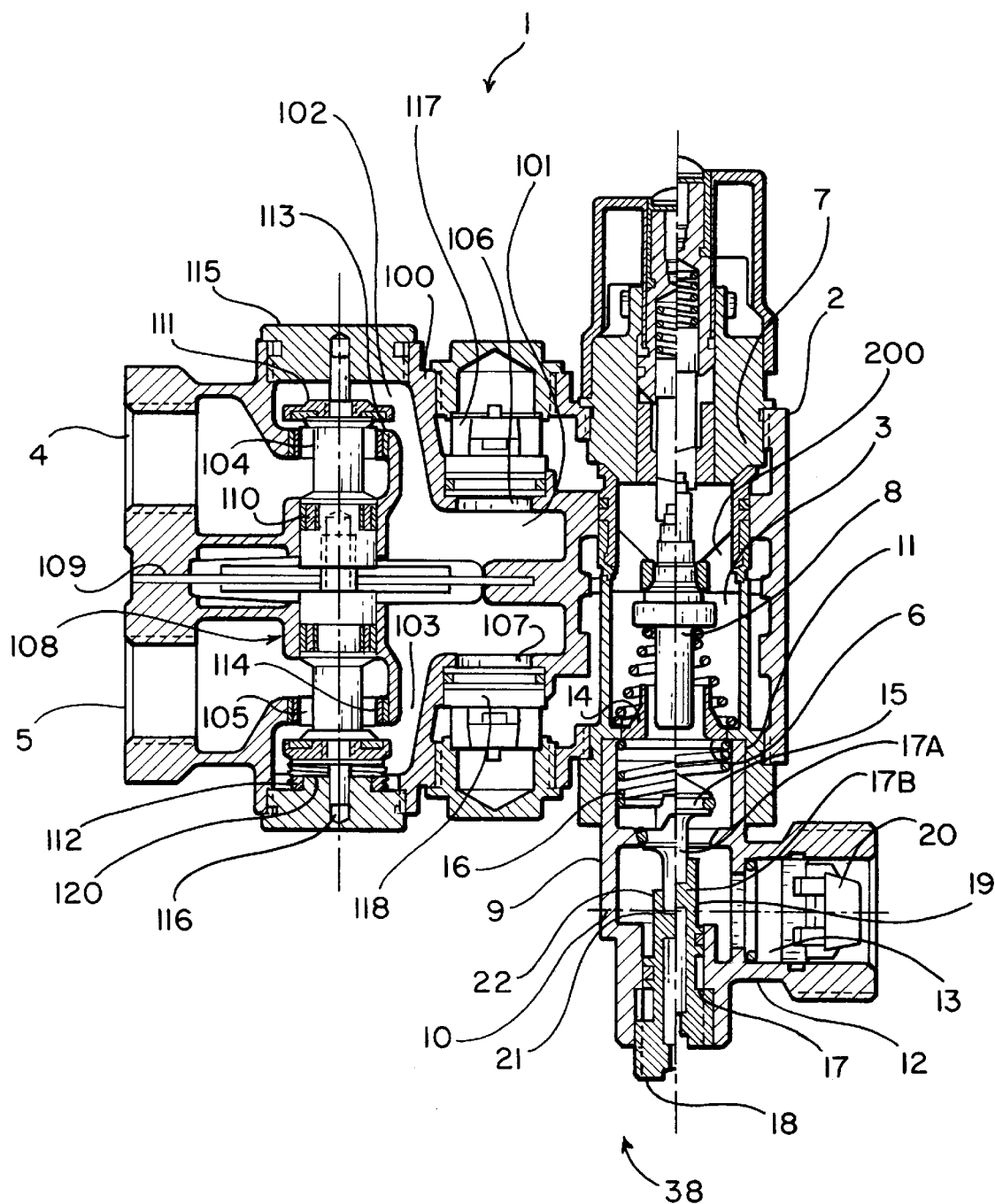
Figure 2:
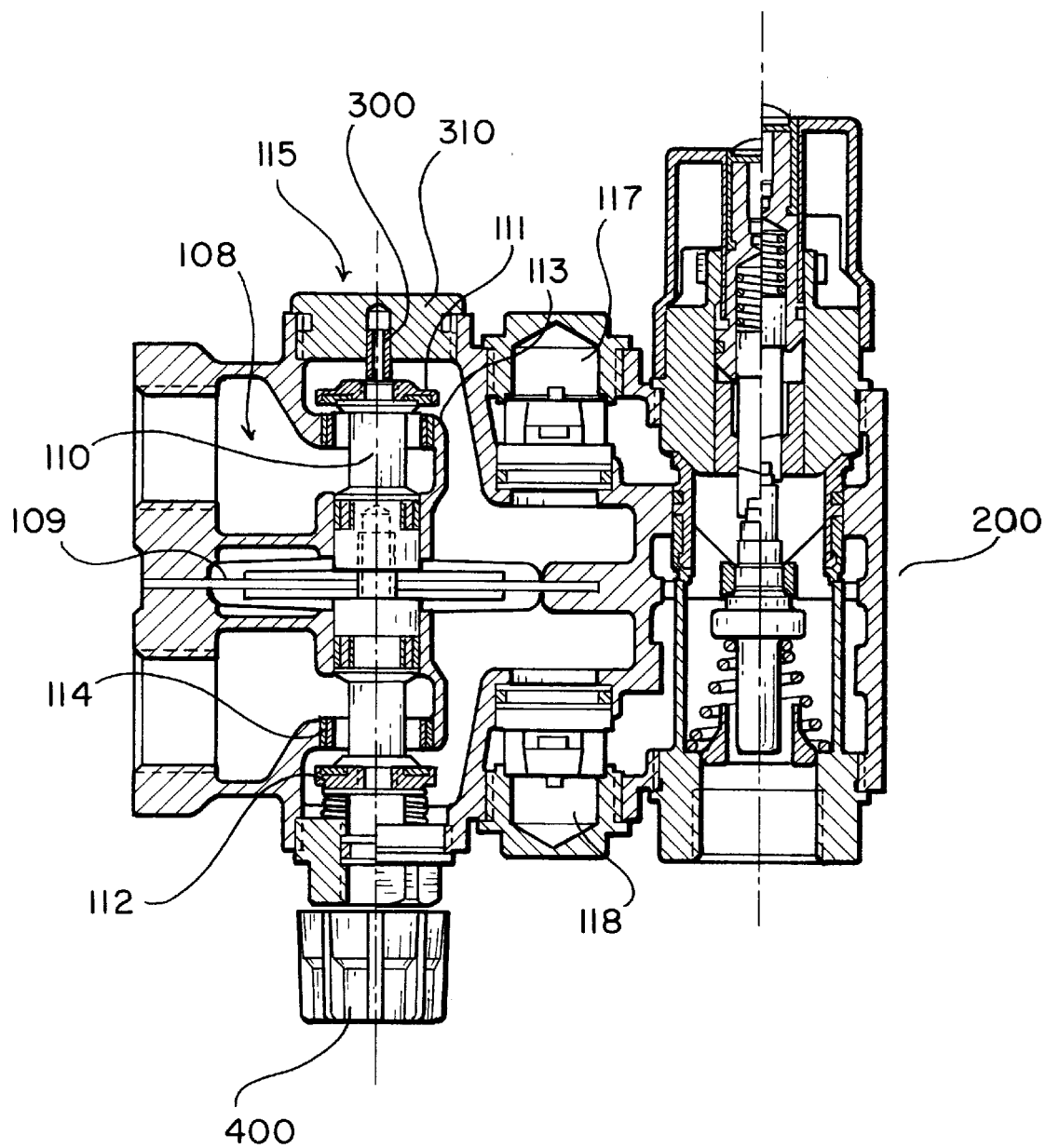

a moving element (108) constituted by a membrane (109) whose plane determines the plane of symmetry of the chambers and a control rod (110) passing through the membrane (109) at its center, to which rod said membrane is attached, valves (111, 112) mounted on each of the two ends of the common control rod, which cooperate with seats (113, 114), means (115, 116) for translationally guiding the control rod, a nonreturn valve (117, 118) installed in each of the inlets of the chambers.

This device is characterized in that the guiding means (115, 116) are located at each of the ends of the control rod and have guiding surfaces smaller than the cross section of the valve and/or the control rod.

10 Claims, 2 Drawing Sheets

DEVICE FOR EQUALIZING HOT WATER AND COLD WATER PRESSURES AND FAUCET, PARTICULARLY THERMOSTATIC, FOR SAID EQUALIZING DEVICE

The invention relates to a device for equalizing the hot water and cold water pressures in a hot water faucet for sanitary use, such as a thermostatic faucet.

It also relates to the faucet, particularly thermostatic, equipped with said equalizing device.

Conventionally, a so-called thermostatic faucet comprises:
- a body that locally delimits a so-called mixing chamber fed at least indirectly by a cold water inlet pipe, and at least indirectly by a hot water inlet pipe,
- an outlet for mixed water having a predetermined temperature,
- a device for adjusting the flows of cold water and hot water to obtain a so-called outgoing water at the appropriate temperature, which device comprises an element that, being sensitive to the temperature of the water in the mixing chamber, controls the movement of a slide valve that adjusts the cross sections of the passages of the hot water and cold water inlets as a function of a set-point value.

Thus, when the water in the mixing chamber exceeds the set-point temperature, the sensitive element reduces the cross section of the passage of the hot water inlet, and at the same time increases the cross section of the passage of the cold water inlet, and vice versa if the temperature is lower than the set-point temperature.

The sensitive element necessarily has an inertia in order to prevent the system from being constantly unstable.

The maintenance the temperature of the water flowing out of the faucet depends primarily on the fluctuations in the inflows of cold water and hot water, and hence on the stability of the cold water and hot water pressures, which inevitably affect the flows.

There is a known pressure equalizing system installed upstream from the mixing chamber of a thermostatic faucet (FR-A-2.636.705), whose purpose is to attenuate the pressure variations.

This device is constituted by a plunger whose ends are hollow so as to form a so-called cold water chamber through which the cold water passes and a so-called hot water chamber through which the hot water passes, these chambers being connected upstream and downstream by radial openings.

The plunger acts like a slide valve.

There is also a known device (U.S. Pat. Nos. 5,341,987 and 3,724,480) for equalizing the hot water and cold water pressures in a faucet of this type comprising, upstream from a thermostatic unit:
- a moving element constituted by a membrane whose plane determines the plane of symmetry of two chambers, and a control rod passing through the membrane at its center, to which rod said membrane is attached,
- valves mounted on each of the two ends of the common control rod, which cooperate with seats,
- means for translationally guiding the control rod,
- a non-return valve installed in each of the outlets of the chambers.

One drawback of this system is low sensitivity and also a non-negligible risk of jamming after a period of disuse.

One of the objects of the invention is to notably improve the safety of hot water faucets for sanitary use, such as thermostatic faucets.

To this end, the subject of the invention is an equalizing device of the type mentioned above, characterized in that the guiding means are located at each of the ends of the control rod and have guiding surfaces that are smaller than the cross-section of the valve and/or the control rod.

The invention will be clearly understood with the aid of the following description, given as a non-limiting example, in reference to the attached drawing, which schematically represents an axial section of an equalizing device mounted on a thermostatic faucet.

Referring to the drawing, we see a hot water faucet 1 for sanitary use, such as a thermostatic faucet.

A thermostatic faucet 1 of this type comprises:
- a body 2 that locally delimits a so-called mixing chamber 3 fed at least indirectly by a cold water inlet pipe 4 and at least indirectly by a hot water inlet pipe 5,
- an outlet 6 for mixed water having a predetermined temperature and
- a device 7 for adjusting the flows of cold water and hot water to obtain a so-called outgoing water at the appropriate temperature, which device comprises an element 8 that, being sensitive to the temperature of the water in the mixing chamber, controls the movement of a slide valve that adjusts the cross sections of the passages of the hot water and cold water inlets as a function of a set-point value.

Thus, when the water in the mixing chamber exceeds the set-point temperature, the sensitive element reduces the cross section of the passage of the hot water inlet, and at the same time increases the cross section of the passage of the cold water inlet, and vice versa if the temperature is lower than the set-point temperature.

The sensitive element necessarily has inertia in order to prevent the system from being constantly unstable.

Advantageously, the faucet is equipped, upstream from the mixing chamber and hence from a thermostatic unit 200, with an equalizing device for attenuating the hot water and cold water pressure variations.

Conventionally, this equalizing device comprises:
- a casing 100 that delimits a receptacle 101 in which are delimited two symmetrical chambers 102, 103, called a cold chamber 102 for the one fed with cold water and a hot chamber 103 for the other one, each of the chambers comprising an inlet 104, 105 and an outlet 106, 107
- a moving element 108 which, when subjected to the pressure of the water contained in the cold and hot chambers, adjusts the cross sections of the passages of the hot water 104 and cold water 105 inlets.

Conventionally, the equalizing device also comprises:
- a moving element 108 constituted by a membrane 109 whose plane determines the plane of symmetry of the chambers, and a control rod 110 that passes through the membrane 109 at its center, to which rod said membrane is attached,
- valves 111, 112 mounted on each of the two ends of the common control rod, which cooperate with seats 113, 114,
- means 115, 116 for translationally guiding the control rod,
- a nonreturn valve 117, 118 installed in each of the outlets of the chambers.

According to one characteristic of the invention, the guiding means 115, 116 are located on each of the ends of the control rod and have guiding surfaces smaller than the cross section of the valve and/or the control rod.

The guiding means 115, 116 are, for example, formed by a slide of smaller cross section than, in particular, the cross section of the control rod, which slide is integral with the end of this control rod and moves inside a bore.

This bore is produced in the body that houses the equalizing device.

More precisely, the bore is produced in a separate piece, such as a cap 310.

One of these caps can be equipped with a tappet whose movement is obtained by a control element 400.

This tappet specifically makes it possible to act on one of the ends of the control rod and to thereby press one of the valves into its seat in order to shut off the inflow of water.

The combination of these technical points allows the system to operate in a position very near equilibrium and to react very quickly.

In fact, the frictional forces on the moving element are slight, particularly due to the small contact surfaces and also due to the shifting of the guidance to one end.

The diameter of the slide is at least smaller than half the diameter of the rod, and preferably tends toward a third of the diameter of the rod.

To improve this performance, the guiding means can comprise on one of the parts in contact with one another a polymer bush 300 or sleeve, preventing the contact of metal on metal which, over time, oxidizes and is covered with scale.

The nonreturn valves installed in the outlets of the chambers, and hence upstream from the mixing chamber of the thermostatic faucet, prevent the pressure in the mixing chamber from affecting the prevailing pressures in the hot and cold chambers.

Advantageously, the axis of movement of these nonreturn valves is parallel to the longitudinal axis of the control rod.

This orientation facilitates the installation/removal of the nonreturn valves and the compactness of the assembly.

In order to further minimize the inertial effect of the unit and improve safety, an elastic element 120 stresses the moving element in the direction of the closing of the valve installed in the hot water inlet.

It is also possible to provide an equalization of the moving element with calibrated springs.

The ratio of the cross sections of the valves and the surface area of the membrane can be approximately 15 to 20, which improves sensitivity.

The valves 111, 112 installed in the inlets are equipped with lip seals.

The surface of these valves is slightly larger than the cross sections of the passages that these valves control in order to produce a result that facilitates the closing of the valve, thus contributing to a limitation of the flow during a pressure increase.

According to another characteristic, the faucet is also equipped downstream from the mixed hot water outlet 6, i.e., at the outlet of the thermostatic unit 200, with a safety device that closes the outlet in response to an excessive temperature.

The safety device 38 comprises:
- a casing 9 that delimits a receptacle 10 running all the way through said casing, with one 11 of the two ends 11, 12 of said receptacle, called the upstream end 11, which at least indirectly has means for hydraulically connecting to the outlet of a hot water faucet, and upstream from the other end 12, an evacuation conduit 13 that opens out of the casing and hydraulically connects to a point intermediate to the two ends of the receptacle, giving the casing a T-shape,
- a seat 14 of a valve 15, delimited in the bore near its upstream end, and installed in the receptacle, beginning at the upstream end:
- a valve 15 with an elastic element 16 that stresses it toward its so-called closed position by applying it to the seat 14, and
- a so called control rod 17 of the valve, connected to a control device 18 capable of pushing said valve toward the so-called open position, counteracting the action of the aforementioned elastic element, between the valve and the control device, this control rod locally comprising a fusible material 19 which, when it is subjected to a temperature higher than a predetermined temperature, melts so that the length of the control rod is reduced, thus causing the closure of the valve.

The control rod 17 of the valve is in two pieces 17A,17B:
- one of the pieces 17A is integral with the valve and forms a valve stem that extends along the longitudinal axis of the bore, and
- the other piece 17B comes to rest against the free end of the stem indirectly through the fusible material 19.

The fusible material 19 is housed in a sheath 21 that insulates the fusible material from fleeting temperature variations.

This sheath 21 also makes it possible to use fusible materials that are not food-safe.

The stem of the valve is partially inserted into this sheath, and an O-ring 22 disposed at the inlet of the linking 21 completes the insulation of the fusible material from the water.

The evacuation conduit houses a nonreturn valve 20.

What is claimed:

1. Device for equalizing the hot water and cold water pressures in a hot water faucet for sanitary use comprising, upstream from a thermostatic unit (200):
    a moving element (108) constituted by a membrane (109) whose plane determines the plane of symmetry of two chambers, and a control rod (110) that passes through the membrane (109) at its center, to which rod said membrane is attached,
    valves (111, 112) mounted on each of the two ends of the common control rod and respectively being operably to control cold water and hot water, the valves cooperate with seats (113, 114), the valves having cross-sections,
    guiding means (115, 116) for translationally guiding the control rod,
    a nonreturn valve (117, 118) installed in each of the outlets of the chambers,
this device being characterized in that the guiding means (115, 116) are located on each of the ends of the control rod and have guiding surfaces smaller than the cross sections of the valves and further comprising an elastic element (120) stressing the moving element in a direction corresponding to closing of the valve (112) controlling hot water.

2. Device according to claim 1, characterized in that the guiding means are formed by a slide of small cross section that moves in a bore produced in a body that houses the equalizing device.

3. Device according to claim 2, characterized in that the guiding means comprise, on one of the parts in contact with one another, a polymer (300) disposed to reduce friction by preventing metal on metal contact.

4. Device according to claim 1, characterized in that a common axis of movement of the nonreturn valves (117, 118) is parallel to a longitudinal axis of the control rod.

5. A thermostatic faucet, characterized in that it is equipped with an equalizing device according claim 1.

6. The thermostatic faucet according to claim 5 further comprising:
- a casing (100) that delimits a receptacle (101) in which are delimited two symmetrical cold and hot chambers (102, 103), the cold chamber (102) fed with cold water and the hot chamber (103) fed with hot water, each of these cold and hot chambers comprising an inlet (104, 105) and an outlet (106, 107),
- a moving element (108) which, when subjected to the pressure of the water contained in the cold and hot chambers, adjusts the cross sections of the passages of the hot water (104) and cold water (105) inlets, and
- a thermostatic unit (200), this faucet being characterized in that it is equipped, downstream from the mixed hot water outlet (6), with a safety device that closes the outlet in response to an excessive temperature.

7. Faucet according to claim 6, characterized in that the safety device (38) comprises:
- a casing (9) that delimits a receptacle (10) running all the way through said casing, with one (11) of the two ends (11, 12) of said receptacle, called the upstream end (11), which at least indirectly has means for hydraulically connecting to the outlet of a hot water faucet, and upstream from the other end (12), an evacuation conduit (13) that opens out of the casing and hydraulically connects to a point intermediate to the two ends of the receptacle, giving the casing a T-shape,
- a seat (14) of a valve (15) delimited in the bore near its upstream end, and installed in the receptacle, beginning at the upstream end:
  - a valve (15) with an elastic element (16) that stresses it toward its so-called closed position by applying it to the seat (14), and
  - a control rod (17) of the valve, connected to a control device (18) capable of pushing said valve toward the so-called open position, counteracting the action of the aforementioned elastic element, between the valve and the control device, this control rod locally comprising a fusible material (19) which, when it is subjected to a temperature higher than a predetermined temperature, melts so that the length of the control rod is reduced, thus causing the closing of the valve.

8. Faucet according to claim 7, characterized in that the control rod (17) of the valve is in two pieces (17A, 17B):
- one of the pieces (17A) is integral with the valve and forms a valve stem that extends along the longitudinal axis of the bore, and
- the other piece (17B) comes to rest against the free end of the stem indirectly through the fusible material (19).

9. Faucet according to claim 8, characterized in that the fusible material (19) is housed in a sheath (21) that insulates the fusible material from fleeting temperature variations.

10. Faucet according to claim 9, characterized in that the valve stem is partially inserted into said sheath and an O-ring (22) disposed at the inlet of the sheath (21) completes the insulation of the fusible material from the water.

* * * * *